United States Patent [19]

Nayar et al.

[11] Patent Number: 5,303,115
[45] Date of Patent: Apr. 12, 1994

[54] PTC CIRCUIT PROTECTION DEVICE COMPRISING MECHANICAL STRESS RISER

[75] Inventors: Deepak Nayar, Hayward; William C. Beadling, San Jose; Thanh U. Chung, Union city; Martin Pineda, Fremont, all of Calif.

[73] Assignee: Raychem Corporation, Menlo Park, Calif.

[21] Appl. No.: 828,544

[22] Filed: Jan. 27, 1992

[51] Int. Cl.⁵ .............................................. H02H 5/04
[52] U.S. Cl. ................................................ 361/106
[58] Field of Search .......................... 252/502–504, 252/510, 511, 518–520; 361/103, 106

[56] References Cited

U.S. PATENT DOCUMENTS

| | | | |
|---|---|---|---|
| 4,237,441 | 12/1980 | van Konynenburg et al. | 338/22 R |
| 4,238,812 | 12/1980 | Middleman et al. | 361/106 |
| 4,255,698 | 3/1981 | Simon | 320/35 |
| 4,272,471 | 6/1981 | Walker | 264/104 |
| 4,304,987 | 12/1981 | van Konynenburg | 219/553 |
| 4,315,237 | 2/1982 | Middleman et al. | 338/22 R |
| 4,317,027 | 2/1982 | Middleman et al. | 219/553 |
| 4,330,703 | 5/1982 | Horsma et al. | 219/553 |
| 4,352,083 | 9/1982 | Middleman et al. | 338/23 |
| 4,388,607 | 6/1983 | Toy et al. | 338/22 SD |
| 4,426,633 | 1/1984 | Taylor | 338/25 |
| 4,475,138 | 10/1984 | Middleman et al. | 361/58 |
| 4,514,620 | 4/1985 | Cheng et al. | 219/553 |
| 4,534,889 | 8/1985 | van Konynenburg et al. | 252/511 |
| 4,545,926 | 10/1985 | Fouts, Jr. et al. | 252/511 |
| 4,560,498 | 12/1985 | Horsma et al. | 252/511 |
| 4,591,700 | 5/1986 | Sopory | 219/505 |
| 4,685,025 | 8/1987 | Carlomagno | 361/106 |
| 4,689,475 | 8/1987 | Matthiesen | 219/553 |
| 4,724,417 | 2/1988 | Au et al. | 338/22 R |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,845,838 | 7/1989 | Jacobs et al. | 29/671 |
| 4,904,850 | 2/1990 | Claypool et al. | 219/548 |
| 4,907,340 | 3/1990 | Fang et al. | 29/610.1 |
| 4,924,074 | 5/1990 | Fang et al. | 219/548 |
| 5,049,850 | 9/1991 | Evans | 338/22 R |

OTHER PUBLICATIONS

Application Serial No. 07/590,114, "Electrical Device", Chan et al, filed Sep. 28, 1990.
Underwriter's Laboratory Standard 1459, Section 50A "Overvoltage Test", pp. 58D through 58J, Jun. 5, 1990.
Underwriter's Laboratory Standard 1459, Appendix, Dec. 13, 1991.

Primary Examiner—A. D. Pellinen
Assistant Examiner—Ronald William Leja
Attorney, Agent, or Firm—Marguerite E. Gerstner; Timothy H. P. Richardson; Herbert G. Burkard

[57] ABSTRACT

A circuit protection device in which a PTC element made from a PTC composition includes or has at a boundary thereof a mechanical stress riser. The device will be tripped by, and provide reversible protection against, a first set of fault conditions, and will also provide protection at least one time against a second, more severe, set of fault conditions which cause physical disruption of the device and which cause the device to have a substantially infinite resistance. Devices of the invention are useful in protecting against relatively high voltages.

18 Claims, 1 Drawing Sheet

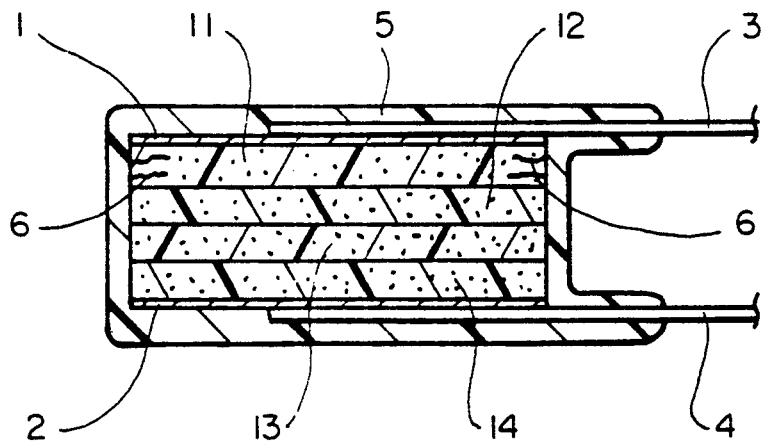
FIG_1
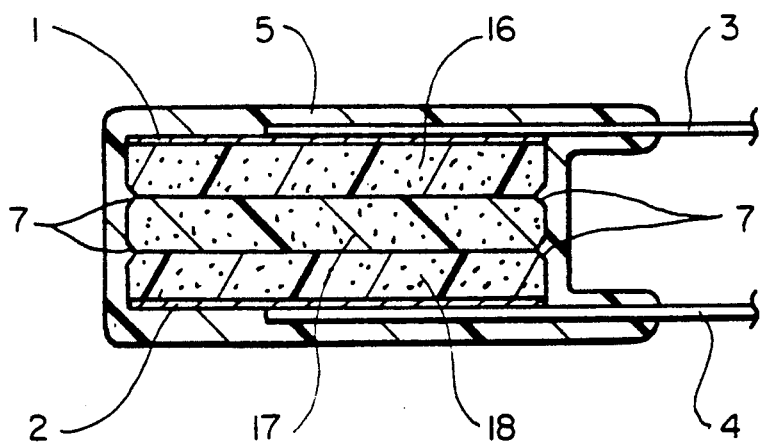
FIG_2
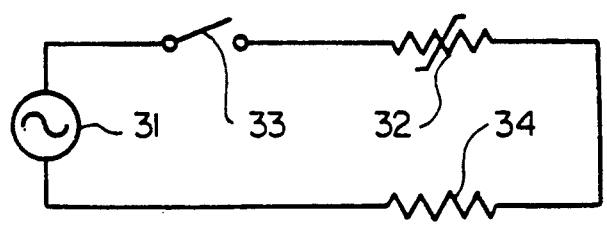
FIG_3

PTC CIRCUIT PROTECTION DEVICE COMPRISING MECHANICAL STRESS RISER

BACKGROUND OF THE INVENTION

Field of the Invention

This invention relates to PTC circuit protection devices.

Introduction to the Invention

Circuit protection devices are well known. A circuit protection device is usually placed in series with a load in an electrical circuit, and under normal operating conditions of the circuit, has a relatively low resistance and low temperature. If, however, a fault arises, the device is "tripped" (i.e. converted to a high resistance, high temperature state) and thus causes a large reduction in the current in the circuit. The fault may be an excessive current in the circuit (which causes the device to generate heat internally and thus to trip) and/or excessive generation of heat in some other way. Examples of such faults include a short circuit, the accidental introduction of an additional power source (e.g. the introduction of a line voltage of 100 to 120 volts AC into a circuit which operates at 24 to 60 volts DC), a failure to remove or reduce a power source at an appropriate time (e.g. as a result of the failure of a bimetallic disconnection device), and overheating of the device by an external heat source, e.g. overheating of an electrical motor. Circuit protection devices containing PTC elements composed of PTC ceramics, e.g. doped barium titanates, have been commercially available for many years. Over the last ten years, however, newly developed circuit protection devices containing PTC elements composed of conductive polymers (i.e. dispersions of particulate conductive fillers in insulating polymers) have provided important advantages over ceramic devices in many situations.

PTC protection devices are usually designed to provide protection against a defined range of expected faults. If the circuit is subjected to a fault outside that range, the device may fail to protect the circuit, or may do so only for a limited time. Another problem which can sometimes occur, even when the fault lies within the defined range of expected faults, is that the device itself, in the tripped state, creates a different type of hazard. For example, the tripped device may generate arcs, and/or burning particles, fumes or other harmful residues. The latter problems can sometimes be ameliorated or overcome by means of appropriate enclosures, but this adds expense and increases the size of the device. Such increased size can create further problems in some circumstances, particularly when the device is to be mounted on a printed circuit board.

To protect against faults which lie outside the defined range of expected faults, the circuit may also include one or more other protection devices. For example, a circuit normally operating at 24 to 60 volts DC might include a PTC protection device to protect against the introduction of a line voltage of 240 volts AC, and a conventional fuse which blows at 600 volts AC to protect against the introduction of a line voltage of 600 volts AC. The use of separate protection devices is, however, undesirable, especially as the desired size of electrical components, in particular the size of components to be secured to printed circuit boards, becomes smaller. This has resulted in the development of composite protection devices which are reversibly tripped under one set of fault conditions, but which are irreversibly converted into an open circuit condition (i.e. to infinite resistance) under other, substantially more severe, fault conditions. These composite protection devices make use of a PTC resistive element and a separate series-connected resistor which does not exhibit PTC behavior but which is thermally linked to the PTC element. These composite protection devices operate by physical disruption of the separate resistor.

SUMMARY OF THE INVENTION

We have discovered that by making use of PTC element which includes, or which has at a boundary thereof, a mechanical stress riser, it is possible to make a PTC protection device which (a) will be tripped by, and provide reversible protection against, a first set of fault conditions, and (b) will provide protection at least one time against a second, more severe, set of fault conditions which causes physical disruption of the device and which thus causes the device to go open circuit, i.e. to have substantially infinite resistance, under the second set of fault conditions. Preferred devices of this kind make use of an encapsulating layer of a polymeric dielectric to ensure that the device does not pose a significant hazard (as a result of the generation of arcs, burning particles or other harmful residues) when subject to faults which will trip the device or which will cause disruption of the device.

In one aspect, the present invention provides a circuit protection device which comprises (1) a PTC element which is composed of a PTC composition and which includes or which has at a boundary thereof a mechanical stress riser, and (2) at least two electrodes which can be connected to a source of electrical power and which, when so connected, cause current to flow through said PTC element;

said device being such that, (1) when the device is in still air at 23° C. and forms a part of a first test circuit which consists essentially of the device, a switch, a source of AC electrical power having a voltage of 250 volts, and a fixed resistor of resistance $R_1$ ohms such that the initial current through the device in the first of the test cycles defined below is 3 amps, and the test circuit is subjected to N successive test cycles, where N is 5, in each of which test cycles the switch is closed for 3 seconds, the switch is then opened and the device is allowed to cool to 23° C. before the next test cycle is carried out, then in each of said test cycles, the result of closing the switch is to convert the device into a high temperature, high resistance stable operating condition; and (2) when the device is in still air at 23° C. and forms part of a second test circuit which consists essentially of the device, a switch, a source of AC electrical power having a voltage of 600 volts, and a fixed resistor having a resistance of 15 ohms, then the result of closing the switch is that the device is physically ruptured so that the current in the test circuit becomes zero in less than 20 milliseconds, preferably less than 8 milliseconds, especially less than 4 milliseconds.

In another aspect the present invention provides a circuit which comprises a power source, a circuit protection device as defined above and an electrical load which is liable to be damaged if it is exposed to a current of 40 amps.

BRIEF DESCRIPTION OF THE DRAWING

The invention is illustrated in the accompanying drawings, in which

FIGS. 1 and 2 are cross-sections through devices of the invention, and

FIG. 3 is a diagram of a circuit of the invention.

DETAILED DESCRIPTION OF THE INVENTION

Where reference is made herein to alternating current (AC) voltages and currents, the values given are root mean square (RMS) values.

The PTC compositions used in the present invention are preferably conductive polymers which comprise a crystalline polymer component and, dispersed in the polymer component, a particulate filler component which comprises a conductive filler, preferably carbon black. The filler component may also contain a non-conductive filler which changes not only the electrical properties of the conductive polymer but also its physical properties. The inclusion of a non-conductive filler which makes the conductive polymer more brittle is particularly useful in the present invention. Suitable conductive polymers for use in this invention are disclosed for example in U.S. Pat. Nos. 4,237,441 (van Konynenburg et al), 4,304,987 (van Konynenburg), 4,388,607 (Toy et al), 4,514,620 (Cheng et al), 4,534,889 (van Konynenburg et al), 4,545,926 (Fouts et al), 4,560,498 (Horsma et al), 4,591,700 (Sopory), 4,724,417 (Au et al), 4,774,024 (Deep et al), and 5,049,850 (Evans et al). The disclosure of each of these patents is incorporated herein by reference.

The PTC element can be composed of one or more PTC compositions. When there is more than one PTC composition, the current preferably flows sequentially through the different compositions, as for example when each composition is in the form of a layer which extends across the full cross section of the device. When there is a single PTC composition, and the desired thickness of the PTC element is greater than that which can conveniently be prepared in a single step, a PTC element of the desired thickness can conveniently be prepared by joining together, e.g. laminating by means of heat and pressure, two or more layers, e.g. melt-extruded layers, of the PTC composition. When there is more than one PTC composition, the PTC element will usually be prepared by joining together, e.g. laminating by means of heat and pressure, elements of the different compositions. For example, a preferred PTC element comprises two laminar elements composed of a first PTC composition and, sandwiched between them, a laminar element composed of a second PTC composition having a higher resistivity than the first.

When a PTC device is tripped, most of the voltage dropped over the device is normally dropped over a relatively small part of the device which is referred to as the hot line, hot plane or hot zone. In the devices of the invention, the PTC element can have one or more features which help the hot line to form at a desired location, usually spaced apart from both electrodes. Suitable features of this kind for use in the present invention are disclosed for example in U.S. Pat. Nos. 4,317,027 and 4,352,083 (Middleman et al), and 4,907,340 and 4,924,072 (Fang et al), the disclosures of which are incorporated herein by reference.

The mechanical stress risers which are present in the devices of the invention can influence the location of the hot line. Preferably, however, they are sufficiently small not to have any substantial effect on the resistance of the cross section of the device in which they occur. The stress risers can be induced by a step in the method of manufacture which has some other primary purpose, for example if the device is prepared by punching a desired shape out of a laminate comprising a PTC element sandwiched between foil electrodes, the punching can induce small fractures (in the edge of the PTC element, parallel to the foil electrodes and close to the foil electrode first penetrated by the punch) which will serve as stress risers. Similarly, if the PTC element is prepared by laminating together two or more layers of two or more different PTC compositions, or is laminated to one or more layers of a conductive polymer which does not exhibit PTC behavior, then shallow grooves can form in the edges of the conductive polymer element along the boundaries of the dissimilar layers, as a result of the different behavior of the layers during treatments, particularly heat treatments, employed to change their electrical properties. Alternatively, the method for making the device can include a step whose only (or primary) purpose is to provide at least one stress riser which will give rise to the desired disruption of the device. The mechanical stress riser can be in the thickness of the PTC element or at a boundary of the PTC element, e.g. at an interface between the PTC element and an electrode or at an interface between the PTC element and another resistive element which lies between the PTC element and an electrode.

Particularly useful devices of the invention comprise two laminar electrodes, preferably metal foil electrodes, and a conductive polymer element sandwiched between them. Particularly suitable foil electrodes are disclosed in U.S. Pat. Nos. 4,689,475 (Matthieson) and 4,800,253 (Kleiner et al), the disclosure of each of which is incorporated herein by reference. A variety of laminar devices of this type are disclosed in U.S. Pat. Nos. 4,238,812 (Middleman et al), 4,255,798 (Simon), 4,272,471 (Walker), 4,315,237 (Middleman et al), 4,317,027 (Middleman et al), 4,330,703 (Horsma et al), 4,426,633 (Taylor), 4,475,138 (Middleman et al), 4,472,417 (Au et al), 4,780,598 (Fahey et al), 4,845,838 (Jacobs et al), 4,907,340 (Fang et al), and 4,924,074 (Fang et al), the disclosure of each of which is incorporated herein by reference. It is possible to make laminar devices of very low resistance, e.g. less than 1 ohm, but in such devices the electrodes are very close together, and, as a result, arcing between the electrodes is likely if the voltage exceeds a relatively low level. Since an objective of the present invention is to make devices which will provide protection at relatively high voltages, it is preferred that the electrodes be separated from each other by a comparatively large distance. This can be achieved by using a resistive element (which consists of or contains the PTC element) which is relatively thick, and/or by having one or both of the electrodes stepped back from the edge of the resistive element, as disclosed for example in U.S. Pat. No. 4,904,850 (Claypool et al) or copending commonly assigned application Ser. No. 07/590,114 (Chan et al) filed Sep. 28, 1990, now U.S. Pat. No. 5,089,801, the disclosure of each of which is incorporated herein by reference. The thickness of the resistive element in the devices of the present invention is preferably at least 0.10 cm, particularly at least 0.15 cm, e.g. 0.175 to 0.25 cm. Such thicknesses are sufficient to accommodate stress risers which will initiate, and preferably propagate, the desired disruption of the device. They also result in separation of the electrodes by distances which reduce the danger of arcing, even under severe conditions such as the tests set forth in Underwriter's Laboratory Standard 1459 (Jun. 5, 1990 and Dec. 13, 1991), the disclosure of which is incorporated herein by reference.

As an additional protection against arcing problems, the devices of the invention preferably also comprise a layer of a polymeric electrically insulating material which surrounds and contacts at least the edges of the electrodes and the sides of the resistive element between the electrodes. Generally the insulating material will encapsulate the whole device and part of the leads to the electrodes. The insulating material should be a relatively flexible material so that it does not substantially inhibit expansion of the PTC material as it trips. Suitable materials include polysiloxanes and flexible epoxies.

We have found that the size of the PTC element is an important factor in the successful operation of the device, i.e. in its disruption under the second set of fault conditions. Thus in a given test condition, for example 600 volts AC and 40 amps (short circuit) as in one of the UL 1459 tests, the power in the device may be sufficient to disrupt a device of one size but insufficient to disrupt an otherwise similar device of larger size and lower room temperature resistance. We have found that the device should preferably have dimensions and resistance such that the power density in the device in the above test (and as further described in the Examples below) is preferably at least 75 watts/mm$^3$, particularly at least 90 watts/mm$^3$, especially at least 110 watts/mm$^3$.

The devices will usually also comprise leads which are secured, e.g. soldered or welded, to the electrodes. These leads can be suitable for insertion into a printed circuit board and may be constructed so that they do not inhibit expansion of the device, as disclosed for example in U.S. Pat. No. 4,685,025 (Carlomagno), the disclosure of which is incorporated herein by reference.

The resistance of the devices of the invention at 23° C. is typically in the range of 2 to 15 ohms.

Referring now to the drawings, each of FIGS. 1 and 2 shows a device comprising metal foil electrodes 1 and 2, leads 3 and 4 which are soldered to the electrodes, and a conductive polymer PTC element between the electrodes. In FIG. 1, the PTC element comprises four identical layers 11, 12, 13 and 14 which have been laminated to each other. The top layer 11 contains stress risers 6 in the form of fractures caused by the punch used to stamp the device out of a larger laminated sheet. In FIG. 2, the PTC element comprises two identical outer layers 16 and 18 of a first PTC conductive polymer and a center layer 17 of a second, higher resistivity PTC conductive polymer. The PTC element includes stress risers in the form of shallow grooves 7 in the sides of the PTC element. These grooves form during processing of a laminate formed by laminating the layers 16, 17 and 18 to each other. In both FIGS. 1 and 2, a layer of polymeric electrically insulating material 5 surrounds and contacts the edges of electrodes 1 and 2 and the sides of the conductive polymer PTC element.

FIG. 3 is a diagram of a circuit of the invention which contains a power source 31, a protection device of the invention 32, a switch 33, and an electrical load 34.

The invention is illustrated by the following Examples, in which Examples 2, 3 and 5 are comparative examples. The overvoltage and cycle life tests referred to in the Examples were carried out as follows. A device is used in one test only.

Cycle Life Test

The cycle life test uses a circuit consisting of the device in series with a switch, a 250 volt 60 Hz AC power source, and a fixed resistor which limits the initial current to 3A. The test consists of a series of test cycles. Each cycle consists of closing the switch for 3 seconds, thus tripping the device, and then allowing the device to cool for 60 seconds. A device is deemed to have failed when it burns or when its resistance at 23° C. has increased to twice its initial resistance at 23° C.

Overvoltage Tests

Test A

Overvoltage test A makes use of a circuit consisting of the device in series with a switch, a 600 volt 60 Hz AC power source, a fixed 15 ohm resistor, and a dual element slow blow fuse sold by Bussman Manufacturing Co. under the trade name MDQ 1-6/10A. The function of the fuse in this test is to simulate electrical components which are to be protected by the device. The test consists of closing the switch for 1.5 seconds. A device passes the test if the current in the circuit becomes zero before the fuse blows. In every such case, there is physical disruption of the device, which is normally evidenced by the device splitting apart. In some cases, however, the physical disruption is not apparent until the device is closely examined.

Test B

Overvoltage test B makes use of a circuit consisting of the device in series with a switch, a 600 volt 60 Hz AC power source, and a fixed 86 ohm resistor. The test consists of closing the switch, thus tripping the device, and maintaining the switch closed for 5 seconds. The device is deemed to pass the test if it remains tripped throughout the test or is physically disrupted so that the current in the test circuit becomes zero.

Test C

Overvoltage test C makes use of a circuit consisting of the device in series with a switch, a 600 volt 60 Hz AC power source, and a fixed 273 ohm resistor. The test consists of closing the switch, thus tripping the device, and maintaining the switch closed for 30 minutes. The device is deemed to pass the test if it remains tripped throughout the test.

EXAMPLE 1

Conductive polymer Composition A was prepared by preblending the components and amounts thereof given in Table I below, mixing them in a Banbury TM mixer, extruding the mixed compound into pellets, and extruding the pellets though a 3.8 cm (1.5 inch) extruder to produce a sheet with a thickness of 0.05 cm (0.020 inch). The extruded sheet was cut into pieces with dimensions of approximately 30.5×30.5 cm (12×12 inches). Four pieces were stacked together between two sheets of 0.0025 cm (0.001 inch) thick electrodeposited nickel foil (available from Fukuda), and the layers were laminated under heat and pressure to form a plaque with a thickness of about 0.20 cm (0.080 inch). Chips (i.e. rectangular samples) with dimensions of 0.4×0.6 cm (0.16×0.24 inch) were punched from the laminated plaque by means of a punch-press. Visual inspection (with the naked eye) showed that the punching process had produced small fractures in the edges of the conductive polymer, parallel to the foils and close to the foil first contacted by the punch. The chips were subjected to the steps of (a) vacuum drying the chips, (b) heat-treating the dried chips at 150° C. in nitrogen for 1 hour, (c) irradiating the heat-treated chips to a dose of 50 Mrad using a 4.5 MeV electron beam, thus crosslinking the polymer, and then repeating steps (a), (b) and (c). Electrical leads (24 AWG copper-clad steel) were attached to the chips by positioning the chips between the leads on a leadframe and then lowering the positioned chips into a solder pot containing 60:40 tin:-copper solder heated to 250° C. for 2 seconds. The resulting devices were encapsulated by coating them with a 0.013 to 0.025 cm (0.005 to 0.010 inch) thick layer of a mineral-filled silicone dielectric (available from ElectroScience Labs under the trade name ESL 240SB), and curing the coating at 150° C. for 2 hours. The encapsulated devices had a resistance at 23° C. in the range of 9 to 12 ohms.

25 devices were tested by the cycle life test; none had failed after 30 cycles. 130 devices were tested by Test A; all passed. 20 devices were tested by Test B; all passed. 20 devices were tested by Test C; all passed. In Test A, the conductive polymer elements split apart in less than 2 msec along a plane which included the fractures produced by the punching process.

EXAMPLE 2

Comparative Example

Devices were prepared according to Example 1 except that the chips were attached to the leads prior to the crosslinking process. The heating during the soldering process was sufficient to remove the visible cracks present as a result of the punching process. 10 devices were tested by Test A; all failed.

EXAMPLE 3

Comparative Example

The components and amounts thereof given in Table I below for Composition B were mixed and extruded following the procedure of Example 1, except that the extruded sheet had a thickness of 0.076 cm (0.030 inch). Devices were prepared in the same way as in Example 1, except that (1) the plaque was prepared by stacking one piece of Composition A between two pieces of Composition B, thus giving a plaque with a thickness of approximately 0.20 cm (0.080 inch), and (2) the chips had dimensions of 0.6×0.6 cm (0.24×0.24 inch). On the devices prior to encapsulation, shallow grooves could be observed around the sides of the conductive polymer element along the junctions between the center and outer layers. The conductive polymer in the center layer had a higher resistivity and was more brittle than the conductive polymer in the outer layers. The encapsulated devices had a resistance at 23° C. in the range of 3 to 4 ohms. 100 devices were tested by Test A; 4 failed, 96 passed, splitting apart in less than 2 msec along one of the planes joining Compositions A and B.

EXAMPLE 4

The procedure of Example 3 was followed, except that the chips had dimensions of 0.4×0.6 cm (0.16×0.24 inch) and a resistance at 23° C. in the range of 6 to 8 ohms. 116 devices were tested by the cycle life test; none had failed after 50 cycles. 100 devices were tested by Test A; all passed. 10 devices were tested by Test B; all passed. 60 devices were tested by Test C; all passed. In Test A, the devices split apart in less than 2 msec along one of the planes joining Compositions A and B.

EXAMPLE 5

Comparative Example

The procedure of Example 3 was followed except that the chips had dimensions of 0.6×1.0 cm (0.24×0.4 inch) and a resistance of about 2.5 ohms. A substantial proportion of the devices failed Test A.

TABLE I

| | | Components in Weight Percent | |
| --- | --- | --- | --- |
| | | Composition | |
| Identity | Tradename (Supplier) | A | B |
| High density polyethylene | Petrothene TM LB832 (USI) | 41.5% | 49.8% |
| Carbon black | Raven TM 430 (Columbian Chemicals) | 32.4% | 50.2% |
| Magnesium hydroxide | Kisuma TM 5A (Kisuma) | 26.1% | |

The overvoltage test results in Examples 1–4 are summarized in Table II below.

TABLE II

| | | Device Passes/Total Devices Tested | |
| --- | --- | --- | --- |
| Example | Chip size (cm) | Test A | Test B | Test C |
| 1 | 0.4 × 0.6 | 130/130 | 20/20 | 20/20 |
| 2 (comparative) | 0.4 × 0.6 | 0/10 | | |
| 3 (comparative) | 0.6 × 0.6 | 96/100 | | |
| 4 | 0.4 × 0.6 | 100/100 | 10/10 | 60/60 |

What is claimed is:

1. A circuit protection device which comprises
   (1) a PTC element which is composed of a PTC composition and which includes or which has at a boundary thereof a mechanical stress riser, and
   (2) at least two electrodes which can be connected to a source of electrical power and which, when so connected, cause current to flow through said PTC element;

said device being such that,
   (1) when the device is in still air at 23° C. and forms a part of a first test circuit which consists essentially of the device, a switch, a source of AC electrical power having voltage of 250 volts, and a fixed resistor of resistance $R_1$ ohms such that the initial current through the device in a first test cycle conducted as defined below is 3 amps, and the test circuit is subjected to N successive test cycles, where N is 5, in each of which test cycles the switch is closed for 3 seconds, the switch is then opened and the device is allowed to cool to 23° C. before the next test cycle is carried out, then in each of said test cycles, the result of closing the switch is to convert the device into a high temperature, high resistance stable operating condition; and
   (2) when the device is in still air at 23° C. and forms part of a second test circuit which consists essentially of the device, a switch, a source of AC electrical power having a voltage of 600 volts, and a fixed resistor having a resistance of 15 ohms, then the result of closing the switch is that the device is physically ruptured so that the current in the test circuit becomes zero in less than 20 milliseconds.

2. A device according to claim 1 wherein the PTC element is part of a resistive element which has a thickness of at least 0.10 cm.

3. A device according to claim 2 wherein the resistive element has a thickness of at least 0.15 cm.

4. A device according to claim 1 which has dimensions and a resistance such that when the device is tested in the second test circuit, the device has a power density of at least 75 watts/mm$^3$.

5. A device according to claim 4 wherein the device has a power density of at least 90 watts/mm$^3$.

6. A device according to claim 1 wherein the device has a resistance of 23° C. of 2 to 15 ohms.

7. A device according to claim 1 wherein (a) the PTC element is part of a resistive element and (b) the device further includes a layer of a polymeric electrically insulating material which surrounds and contacts the electrodes and the resistive element.

8. A device according to claim 7 wherein the insulating material comprises polysiloxane.

9. A device according to claim 7 wherein the insulating material comprises flexible epoxy.

10. A circuit which comprises
(A) a power source,
(B) a circuit protection device which comprises
  (1) a PTC element which is composed of a PTC composition and which includes or which has at a boundary thereof a mechanical stress riser, and
  (2) at least two electrodes which can be connected to a source of electrical power and which, when so connected, cause current to flow through said PTC element;
said device being such that,
  (1) when the device is in still air at 23° C. and forms a part of a first test circuit which consists essentially of the device, a switch, a source of AC electrical power having voltage of 250 volts, and a fixed resistor of resistance $R_1$ ohms such that the initial current through the device in a first test cycle conducted as defined below is 3 amps, and the test circuit is subjected to N successive test cycles, where N is 5, in each of which test cycles the switch is closed for 3 seconds, the switch is then opened and the device is allowed to cool to 23° C. before the next test cycle is carried out, then in each of said test cycles, the result of closing the switch is to convert the device into a high temperature, high resistance stable operating condition; and
  (2) when the device is in still air at 23° C. and forms part of a second test circuit which consists essentially of the device, a switch, a source of AC electrical power having a voltage of 600 volts, and a fixed resistor having a resistance of 15 ohms, then the result of closing the switch is that the device is physically ruptured so that the current in the test circuit becomes zero in less than 20 milliseconds, and
(C) an electrical load which is liable to be damaged if it is exposed to a current of 40 amps.

11. A circuit according to claim 10 wherein the PTC element of the device is part of a resistive element which has a thickness of at least 0.10 cm.

12. A circuit according to claim 11 wherein the resistive element has a thickness of at least 0.15 cm.

13. A circuit according to claim 10 wherein the device has dimensions and a resistance such that when the device is tested in the second test circuit, the device has a power density of at least 75 watts/mm$^3$.

14. A circuit according to claim 13 wherein the device has a power density of at least 90 watts/mm$^3$.

15. A circuit according to claim 10 wherein the device has a resistance at 23° C. of 2 to 15 ohms.

16. A circuit according to claim 10 wherein (a) the PTC element of the device is part of a resistive element and (b) the device further includes a layer of a polymeric electrically insulating material which surrounds and contacts the electrodes and the resistive element.

17. A circuit according to claim 16 wherein the insulating material comprises polysiloxane.

18. A circuit according to claim 16 wherein the insulating material comprises flexible epoxy.

* * * * *